United States Patent [19]

Cherne

[11] 4,190,619
[45] Feb. 26, 1980

[54] LIQUID AERATING ROTOR ASSEMBLY
[75] Inventor: Lloyd G. Cherne, Edina, Minn.
[73] Assignee: Cherne Industries, Inc., Edina, Minn.
[21] Appl. No.: 924,886
[22] Filed: Jul. 17, 1978
[51] Int. Cl.² .............................................. B01F 7/04
[52] U.S. Cl. ............................... 261/92; 210/242 A; 261/120; 239/220
[58] Field of Search ................... 261/92, 120; 61/1 F; 210/242 A, 242 S, 242 AS, DIG. 25; 114/40, 41, 43; 239/220

[56] References Cited

U.S. PATENT DOCUMENTS

| | | | |
|---|---|---|---|
| 151,774 | 6/1874 | Grant | 114/41 |
| 3,561,738 | 2/1971 | Galeano | 210/242 A |
| 3,572,273 | 3/1971 | Wood | 114/40 |
| 3,682,316 | 8/1972 | Waren | 210/242 S |
| 3,685,653 | 8/1972 | Van Stavern et al. | 210/242 S |
| 3,700,109 | 10/1972 | Lasko | 210/242 S |
| 3,759,495 | 9/1973 | Boler et al. | 261/120 |
| 3,804,177 | 4/1974 | Renfroe | 210/DIG. 25 |
| 4,085,049 | 4/1978 | Hartwick et al. | 210/242 S |

*Primary Examiner*—Frank W. Lutter
*Assistant Examiner*—Gregory N. Clements
*Attorney, Agent, or Firm*—Merchant, Gould, Smith, Edell, Welter & Schmidt

[57] ABSTRACT

An improved liquid aerating rotor assembly comprises a support frame having a rotor mounted for rotation about a horizontal axis. A plurality of floats support the rotor and support frame on the surface of a sewage pond or the like. A V-shaped deflecting plow or V-shaped front float is located upstream of the rotor. This configuration causes the upstream surface layer of liquid to pass around the rotor. This prevents any solid debris located in the surface layer of liquid from jamming the rotor and allows more complete aeration of sub-surface liquid. Alternatively, a scoop may replace the V-shaped deflecting members.

3 Claims, 3 Drawing Figures

LIQUID AERATING ROTOR ASSEMBLY

BACKGROUND OF THE INVENTION

1. Field of the Invention

This invention relates in general to sewage treatment processes and various apparatus for performing those processes. More particularly, this invention relates to an improved liquid aerating rotor assembly of the type used in an aerobic bacterial activated sludge process of sewage treatment.

2. Description of the Prior Art

With the advent of relatively strict governmental controls regarding the pollution of the environment, including the pollution of the nation's water supply, sewage treatment processes and apparatus have become increasingly important. At one time it was customary for sewage to merely be dumped into any available water supply as a means of disposal. This practice by in large is no longer tolerated. It is often now required that the sewage be purified before being deposited into a river or other water source to a state where the water returned to the natural water source is more pure than the water originally extracted therefrom.

One well known type of sewage treatment process which has a number of variations is that which is known generally as aerobic processes. A specific type of aerobic process which is widely used is the aerobic bacterial activated sludge process. In these processes, it is important to aerate or mix the sewage to increase the oxygen content thereof to facilitate the sewage treatment process.

Aeration and mixing devices of various types are well known in the art. A particularly useful device is illustrated in U.S. Pat. No. 3,759,495 which is assigned to the assignee of this invention. This patent discloses a liquid aerating rotor assembly which employs a support frame on which a rotor is rotationally mounted. The rotor rotates about a horizontal axis and has a plurality of mixing surfaces which lift, aerate, and mix the liquid sewage. The rotor assembly is preferably mounted by a plurality of floats to float on top of the liquid sewage. In addition, the rotor assembly is often braced in a fixed position in a race-track or channel type of sewage pond or basin. The rotor induces a flow in the sewage basin which ensures complete mixing of the sewage in conjunction with the aeration imparted to the sewage by this same rotor.

While the rotor assembly shown in the above-noted patent is effective for performing the aerating and mixing function for which it is designed, a number of problems are associated with the use thereof. For one thing, in northern climates where the temperatures during the winter often goes below freezing for extended periods of time, it is not unusual for the surface of the sewage pond or the like to contain relatively large chunks of ice. Such chunks or fragments of ice are present even in those sewage ponds which tend to completely freeze whenever the ice in the pond is broken up either mechanically or during the annular spring thawing. In addition, it is also not unusual for sewage ponds to contain relatively large chunks of debris therein. Thus, when the rotor assembly shown in the above-noted patent is moved or pulled across the surface of the pond, the ice or other debris present in the surface layer of liquid tends to jam the rotor. In extreme cases, this debris will break the rotor blades requiring that the rotor element be replaced. Since the rotor element is often extremely expensive, this is a disadvantageous situation. In addition, the need to replace the rotor element means that a certain amount of down time will be encountered during which the sewage treatment plant or process is inoperative.

One other drawback is sometimes encountered by the device noted in the above patent. While this device is effective in mixing and aerating the sewage, it often has to work harder to accomplish this function because it tends to lift and aerate only the surface layer of liquid. Since the surface layer is the most oxygen rich layer in the pond, an undue amount of horsepower or work must be expended in order to further increase the oxygen content thereof. While various deflecting members may be used to direct the aerated sewage coming from the rotor off to one side or the other so as not to re-aerate that same layer immediately, these deflecting members are still not effective in drawing or causing sub-surface layers of liquid to be directly drawn into the rotor.

SUMMARY OF THE PRESENT INVENTION

One aspect of this invention is to provide an improved liquid aerating rotor assembly for use in an aerobic process of sewage treatment.

The improved liquid aerating rotor assembly of this invention comprises a device generally similar to that shown in the above-noted patent. In other words, this invention consists of a rotor assembly which includes a support frame, a rotor rotationally mounted on the support frame which rotor aerates liquid sewage, and means for supporting the support frame on the surface of a pool or body of liquid sewage. However, this invention is particularly directed to means for bringing sub-surface liquid into contact with the rotor member and for preventing such liquid from containing large pieces of debris. This may be accomplished in two alternative manners. The first way is to use a sub-surface scoop whose outlet is generally adjacent the rotor member and which outlet is configured to deflect surface debris away from the rotor. The second way is to use a V-shaped member upstream of the rotor to cause pieces of debris to pass around the rotor and to deflect away the upstream surface layer of the liquid so as to cause the rotor to contact a new surface layer comprising oxygen deficient sub-surface liquid.

BRIEF DESCRIPTION OF THE DRAWINGS

This invention will be described in detail hereafter in the following Detailed Description, when taken in conjunction with the following drawings, in which like reference numerals will refer to like elements throughout.

DETAILED DESCRIPTION

Figure 1:
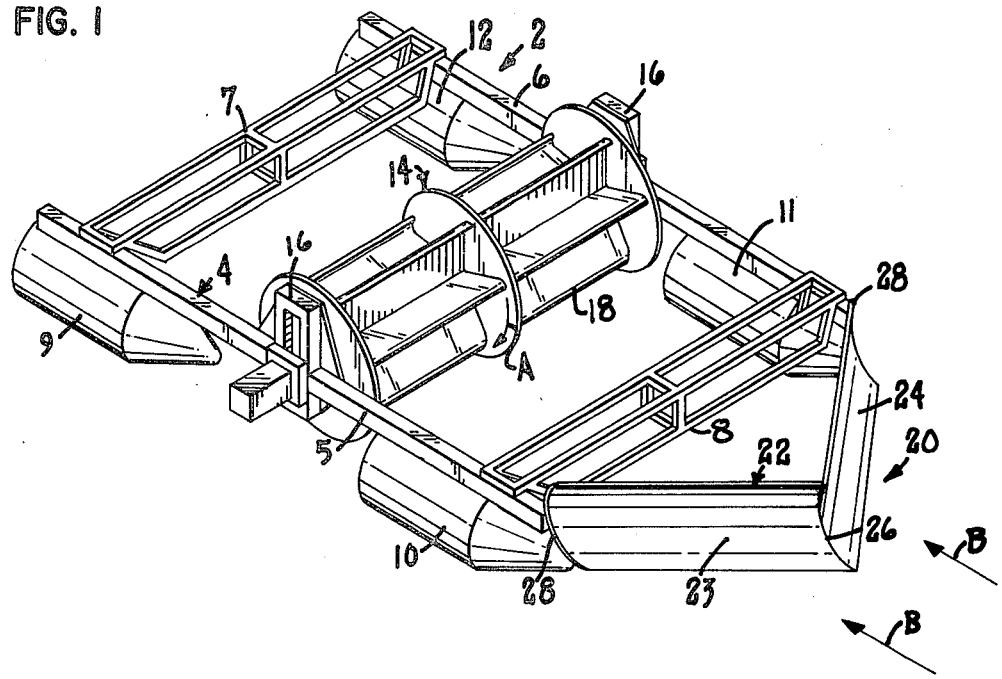
FIG. 1 is a perspective view of a first embodiment of an improved liquid aerating rotor assembly according to this invention.

An improved liquid aerating rotor assembly according to this invention is illustrated generally as 2 in FIG. 1. Rotor assembly 2 is of the same general type as that described in U.S. Pat. No. 3,759,495, which is assigned to the assignee of the present invention and application. This patent is herein incorporated by reference with regard to the details of the structure and operation of liquid aerating assembly 2. However, the structure and operation of rotor assembly 2 will be described herein insofar as is necessary for an understanding of the present invention.

Rotor assembly 2 comprises a substantially rigid, rectangular support frame 4. Support frame 4 includes two, spaced, longitudinally extending beam members 5 and 6. Beam members 5 and 6 are interconnected at either end by transversely extending end cross members 7 and 8. Cross members 7 and 8 preferably comprise three-dimensional, rigid, rectangular box-like structure which rigidify support frame 4. In addition, support frame 4 has means for supporting itself on the surface of liquid sewage. This sewage is preferably, but not necessarily, of the type customarily found in an aeration basin or pond used in an aerobic bacterial activated sludge sewage treatment process. The Cherne Cyclo-Static™ Wastewater Treatment System is one specific sewage treatment process with which rotor assembly 2 can be used. The supporting means for the support frame 4 comprise a plurality of pontoons or float members 9, 10, 11 and 12. Floats 9-12 have a cylindrical body portion and a conical tip which is oriented to point in the longitudinal direction of support frame 4 as shown in FIG. 1.

Rotor assembly 2 further conventionally comprises a rotatable rotor generally illustrated as 14. Rotor 14 is rotatably mounted by bearings in a suitable support structure 16 located on each of the beams 5 and 6 near the midpoint thereof. A suitable electrical or hydraulic motor (or any other suitable power means) may be coupled to the rotor 14 for the purposes of rotating the rotor in an aerating direction generally shown by the arrow A.

Rotor 14 has a plurality of radially extending vanes or paddle wheels 18. The specific shapes of paddle wheels 18 and the materials from which they are constructed may vary. For example, rotor 14 could be of the type shown in the above-noted U.S. patent. Alternatively, the rotor 14 as actually portrayed herein is of the type which corresponds to that disclosed and claimed in Applicant's co-pending U.S. patent application, Ser. No. 924,887, filed July 17, 1978, entitled ROTORS AND ROTOR SEGMENTS FOR USE IN AERATING AND MIXING SEWAGE. In any event, the structure of rotor 14 ensures that the paddle wheels 18 act as aerating surfaces which lift, mix and aerate the liquid sewage immediately adjacent the rotor 14.

As noted previously, rotor assembly 2 is adapted to float on top of the liquid sewage contained in a sewage basin or pond. In addition, it is preferred that rotor assembly 2 be connected, e.g. by braces attached to support frame 4, to a suitable means for fixedly mounting the unit in a sewage race-track type of treatment channel. The sewage is then propelled or moved past the rotor assembly 2 by the flow induced in the sewage in the treatment channel by the rotation of rotor 14. Assembly 2 is of course free to move vertically by virtue of its flotation floats to accommodate variations in the depth of the sewage in the basin or pond.

The present invention relates in general to a system or means for deflecting the upstream surface layer of liquid sewage around and out of contact with the rotor 14. This accomplishes two novel functions. First, it ensures that any debris, such as ice chunks or the like, which is present in the liquid sewage immediately in front of rotor assembly 2 does not reach or foul rotor 14. In addition, it ensures a more complete aeration of the liquid sewage as will be described in more detail hereafter.

Referring first to FIG. 1, a first deflecting means for performing the above-noted features of the present invention is generally indicated as 20. Deflecting means 20 comprises a vertically oriented V-shaped plow or deflecting member 22 fixedly mounted on the front of support frame 4 upstream of rotor 14. In particular, plow 22 comprises curved or scooped first and second panels 23 and 24 which come together at an apex 26. Panels 23 and 24 extend transversely to a position in front of beams 5 and 6 of support frame 4. Panels 23 and 24 are preferably metallic and are fixedly attached to beams 5 and 6 (e.g., by welding) at 28. In using the FIG. 1 embodiment, when rotor assembly 2 is fixed, the liquid sewage which moves past the assembly 2 is deflected by the plow 22 which guides the upstream surface layer of liquid sewage around and out of contact with rotor 14.

Figure 2:
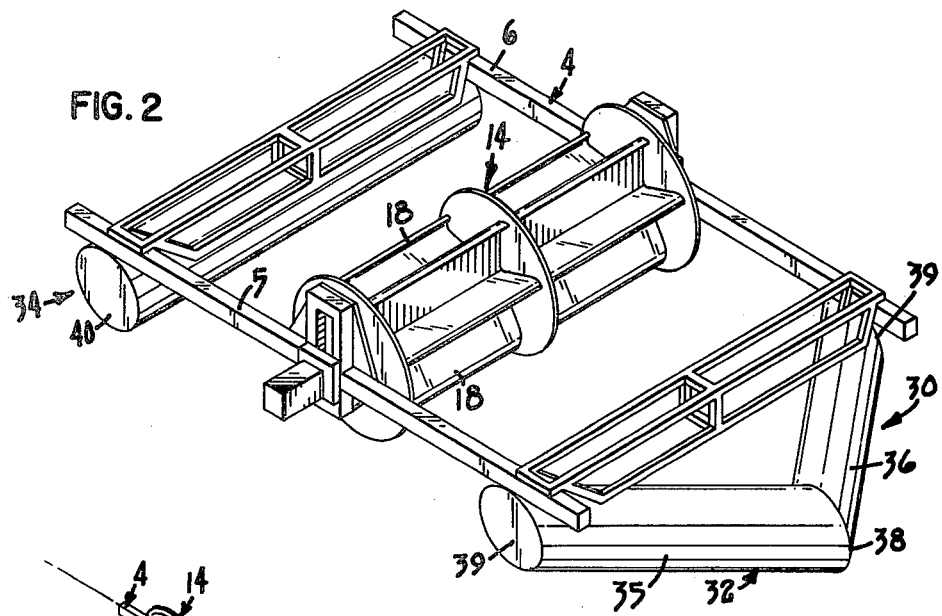
FIG. 2 is a perspective view of a second embodiment of an improved liquid aerating rotor assembly according to this invention.

Referring now to FIG. 2, a second embodiment of a deflecting means according to the present invention is generally illustrated as 30. In this embodiment, most of the basic components of rotor assembly 2 remain the same. In other words, a rectangular support frame 4 is provided having a rotationally mounted rotor 14. However, with regard to the deflecting means 30, the floats 9-12 have been replaced by two transversely mounted floats 32 and 34.

Deflecting means 30 comprises a front float means or member 32 and a rear float means or member 34. Front float member 32 is V-shaped having a first cylindrical section 35 and a second cylindrical section 36. The first and second sections 35 and 36 are fixedly connected together at an apex 38. The apex 38 is situated forwardly of the ends 39 of the sections 35 and 36. The ends 39 of float sections 35 and 36 are fixedly connected to the underside of beams 5 and 6 upstream of rotor 14. Rear float member 34 simply comprises a cylindrical float 40 transversely mounted (e.g., by welding to beams 5 and 6) at the rear of support frame 4 generally underneath cross member 7.

Deflecting means 30 operates similarly to deflecting means 20. In other words, the front V-shaped float member 32 acts similarly to the V-shaped plow 22. It causes the upstream surface layer of liquid sewage to be deflected around and out of contact with rotor 14. Although both the plow 22 and the v-shaped float 32 perform this function, the embodiment of FIG. 2 is preferred for a number of reasons. First, the material expenses are somewhat less since the front float member 32 acts both as the flotation support and as the deflecting member. In addition, it enables a slightly longer rotor 14 to be used for the same basic width of rotor assembly 2. This is because the side beams 5 and 6 can be mounted at the very ends of floats 32 and 34 whereas the same beams 5 and 6 could be mounted only along the midpoints of floats 9-12 in the FIG. 1 embodiment. Thus, the rotor assembly 2 according to the FIG. 2 embodiment has a slightly longer rotor 14, and correspondingly a larger aerating capacity, for the same basic width of the assembly.

Figure 3:
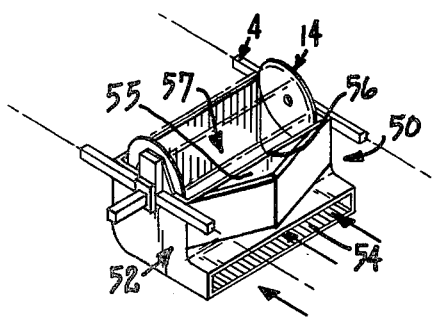
FIG. 3 is a partial perspective view of a third embodiment of an improved liquid aerating rotor assembly according to this invention.

Finally, FIG. 3 discloses another embodiment for accomplishing the novel aspects of this invention. In this embodiment, the same basic support frame 4 with the rotationally mounted rotor 14 is used. Not all of the support frame 4 has been illustrated in FIG. 3, but it is generally identical to the support frame shown in FIG.

1 with four floats 9-12 present at each corner of the frame 4. However, no V-shaped plow 22 is shown but could be present if desired in the FIG. 3 embodiment.

The deflecting means of the FIG. 3 embodiment is generally indicated as 50. Deflecting means 50 comprises a scoop member 52 mounted along the inside of beams 5 and 6 adjacent rotor 14. Scoop member 52 has a sub-surface inlet opening 54 which serves to scoop sub-surface sewage liquid into the opening as the flow of sewage is induced by rotation of the rotor 14. Scoop 50 has an upwardly extending section 55 which terminates in an outlet opening 56. Outlet 56 surrounds the rotor 14 over the lower half thereof. This forms a pool 57 of sub-surface liquid around rotor 14 which has been brought in through inlet opening 54. In addition, the vertical section 55 of scoop 52 extends sufficiently high to protect the rotor from any surface debris in the liquid sewage. Thus, the embodiment shown in FIG. 3 accomplishes the novel features of this invention.

As stated previously, all three of the embodiments shown herein have two primary functions. The first function is protection of rotor 14 by preventing the upstream surface layer of liquid from contacting or reaching rotor 14. Thus, any debris carried in the upstream surface layer of liquid is not able to jam or foul the rotor. This means that rotor member 14 can be operated even in sewage ponds which have a considerable amount of debris, such as ice therein, without fear of breaking or fracturing the paddle wheels 18.

Furthermore, each rotor assembly 2 accomplishes more complete aeration of the liquid in the sewage pond for the same work expended. In this regard, if one were to look at a vertical section of the sewage pond, those layers of the sewage liquid which are nearest to the surface are the most oxygen rich. The liquid layers become progressively less oxygen rich, or more oxygen deficient, as one proceeds downwardly. It is always easiest to aerate those layers of the sewage liquid which are the most oxygen deficient since oxygen will permeate or transfer into these layers with the least amount of work. Thus, to ensure complete and adequate aeration of the sewage liquid in the sewage pond, one ideally would wish to aerate by means of rotor assembly 2 the most oxygen deficient layers.

Now considering the operation of the three embodiments for rotor assembly 2, when both the V-shaped deflecting plow 22 and the V-shaped front float 32 deflect the upstream surface layer away from rotor 14, a new or fresh surface layer is formed immediately adjacent rotor 14. This new surface layer contains that liquid which had previously been sub-surface liquid. This liquid will be more oxygen deficient than the upstream surface layer which has just been deflected away. Thus, it will be more easy to aerate that liquid, thereby requiring less horse-power for rotor 14 or enabling a greater amount of aeration for a given amount of horsepower. The degree to which such oxygen deficient layers are brought into contact with rotor 14 depends on the vertical extent of the upstream surface layer which is deflected away. That depends of course on how deeply the deflecting member 22 or 32 sinks into the sewage pond. This degree of sinkage is proportional to the amount of weight carried on the floatation apparatus for rotor assembly 2. In any event, this weight is so chosen such that the deflecting member 22 or 32 sinks a sufficient degree into the liquid to ensure that sufficiently oxygen deficient layers will be brought into contact with rotor 14. Desirably, it is sufficient to aerate the liquid sewage to an oxygen value of two parts per million (PPM) with 10 PPM representing an oxygen saturated condition for the liquid sewage. Thus, the present invention ensures that the oxygen deficient layers brought into contact with rotor 14 will have oxygen values of less than 2 PPM.

With regard to the operation of deflecting means 50, it is apparent that the use of the sub-surface scoop 52 also ensures that the more oxygen deficient sub-surface layers will be brought into contact with rotor 14. In addition, because scoop 52 has section 55 up and around the lower half of rotor 14, scoop 52 also serves to protect rotor 14 from debris by deflecting away the upstream surface layer.

Various modifications of the present invention will be apparent to those skilled in the art. Thus, the scope of this invention is to be limited only by the appended claims.

What is claimed is:

1. An improved liquid aerating rotor assembly for aeration of liquid during relative movement of the liquid and the rotor assembly along a desired path, wherein the rotor assembly is of the type which comprises a support frame; a rotor rotatably supported on the support frame for rotation about a horizontal axis, the rotor having means for aerating the liquid as it rotates; power means for rotating the rotor about its axis; and means for supporting the support frame on the surface of the liquid, and wherein the improvement comprises means for directing sub-surface liquid to the rotor for mixing and aerating the sub-surface liquid which is substantially free of large floating debris, wherein the directing means comprises a scoop having:
    (a) an inlet end located beneath the surface of the liquid;
    (b) an outlet end located above the surface of the liquid and adjacent to and surrounding the rotor; and
    (c) an enclosed vertical body section which fluidically connects the inlet and outlet ends to form the scoop, wherein the vertical body section extends above the surface of the liquid to surround the rotor and form a pool of liquid contained inside the vertical body section which the rotor can contact and aerate, and wherein the liquid in the pool is constantly replenished during rotation of the rotor with sub-surface liquid which is drawn in through the inlet end and conducted through the vertical body section into the pool by rotation of the rotor.

2. An improved liquid aerating rotor assembly as recited in claim 1, in which the vertical body section is configured to deflect floating debris on the upstream surface layer of the liquid around and out of contact with the rotor.

3. An improved liquid aerating rotor assembly as recited in claim 2, wherein the vertical body section extends sufficiently high above the surface of the liquid to surround approximately a lower half of the rotor thereby protecting the lower rotor half from any floating surface debris.

* * * * *